United States Patent [19]

Maru et al.

[11] 4,362,788
[45] Dec. 7, 1982

[54] FUEL CELL SYSTEM WITH ANODE AND CATHODES OPERATING AT DIFFERENT PRESSURES

[75] Inventors: Hansraj C. Maru; Bernard S. Baker, both of Brookfield Center, Conn.

[73] Assignee: Energy Research Corporation, Danbury, Conn.

[21] Appl. No.: 242,671

[22] Filed: Mar. 11, 1981

[51] Int. Cl.³ .............................................. H01M 8/04
[52] U.S. Cl. ........................................ 429/13; 429/17
[58] Field of Search .................... 429/17, 19, 30, 25, 429/13, 12, 31, 32, 33, 16

[56] References Cited

U.S. PATENT DOCUMENTS

| | | | |
|---|---|---|---|
| 3,972,731 | 8/1976 | Bloomfield et al. | 429/17 |
| 3,973,993 | 8/1976 | Bloomfield et al. | 429/17 |
| 3,976,506 | 8/1976 | Landau | 429/17 |
| 3,976,507 | 8/1976 | Bloomfield | 429/17 |

*Primary Examiner*—Donald L. Walton

[57] ABSTRACT

A fuel cell system wherein the fuel and oxidant gases are supplied to the respective anode and cathode sections of the system fuel cell at different pressures, the pressure of the fuel gas being lower than that of the oxidant gas which is maintained high to promote fuel cell efficiency.

10 Claims, 1 Drawing Figure

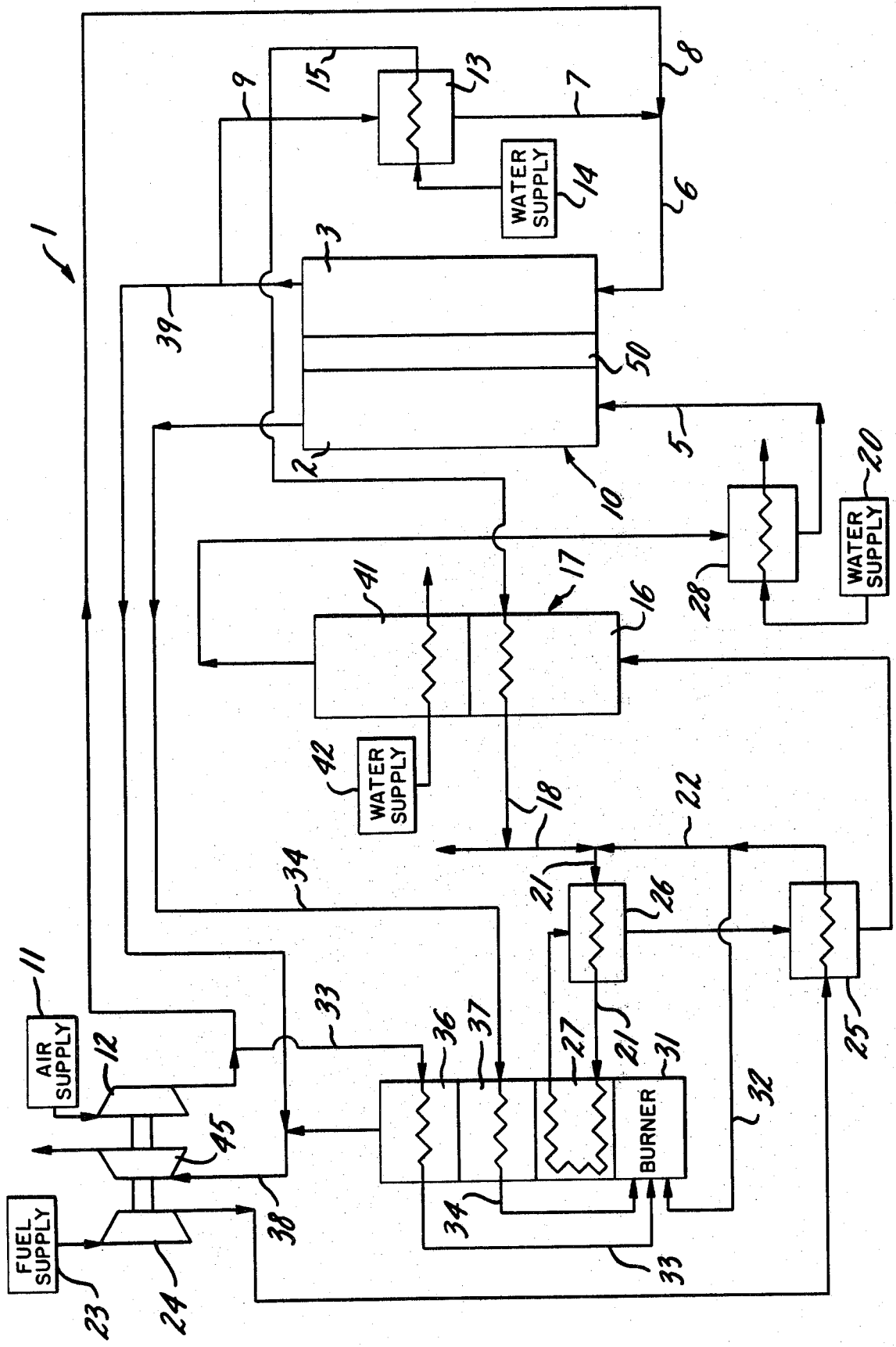

FUEL CELL SYSTEM WITH ANODE AND CATHODES OPERATING AT DIFFERENT PRESSURES

BACKGROUND OF THE INVENTION

This invention relates to fuel cell systems, and in particular, to apparatus and method for operatingg such systems.

In fuel cell systems, the tendency has been to operate the system fuel cell at higher process gas pressures to obtain greater fuel cell efficiency. This is discussed, for example, in the following U.S. Pat. Nos. 3,972,731; 3,973,993; 3,976,506; and 3,976,507. Increasing the process gas pressure, however, has certain disadvantages when fuel cell systems are operated as heretofore contemplated. Thus, in present day systems oxidant process gas and fuel process gas pressures are maintained substantially the same (e.g., a pressure differential of less than about 1 psi is customary). Increasing the operating pressure of the fuel cell is thus generally carried out by increasing both process gas pressures (see, e.g., the aforementioned U.S. patents). Since the fuel gas pressure is determined by the pressure of steam used in the system fuel processing equipment, i.e., the system fuel gas reformer, increased fuel process gas pressure necessitates increased steam pressures. Increasing the steam pressure required for fuel processing, i.e., for reforming reaction in turn, requires higher cell operating temperatures, since the fuel cell waste heat is generally utilized for steam production. Increased fuel cell temperatures; however, result in shorter fuel cell life.

U.S. application Ser. No. 226,801 filed Jan. 21, 1981, assigned to the same assignee hereof, discloses a system which enables the production of high pressure steam without increased fuel cell temperature through the use of an auxilliary heat exchanger which responds to the exhaust oxidant gas and to a higher temperature gas derived elsewhere in the system and which through heat exchange increases the exhaust oxidant gas temperature. The oxidant gas at the higher temperature is then applied to a steam generator for generating steam at the pressure necessary to produce fuel process gas at the required high pressure (e.g., at a pressure in the range of about 30 to 200 psia).

While the above disclosed system contemplates one method of enabling high fuel cell pressures other techniques are still being sought.

It is an object of the present invention to provide an improved fuel cell system capable of high pressure operation.

It is a further object of the present invention to provide a high pressure fuel cell system having increased life and efficiency.

SUMMARY OF THE INVENTION

In accordance with the principles of the present, the above and other objectives are realized in a fuel cell system wherein the fuel and oxidant gases are supplied to the respective anode and cathode sections of the system fuel cell at different pressures, the pressure of the fuel gas being lower than that of the oxidant gas which is maintained high to promote fuel cell efficiency.

Use of a lower pressure fuel gas permits the use of lower pressure steam in the reforming reaction. The temperature of the exhaust oxidant gas used to produce the steam can thus be lower, thereby enabling operation of the fuel cell at a lower temperature and, extending fuel cell life. Furthermore, the reformation reaction can be at a lower pressure, reducing the equilibrium methane content and, therefore, increasing the system efficiency.

BRIEF DESCRIPTION OF THE DRAWINGS

The above and other features of the present invention will become more apparent upon reading the following detailed description in conjunction with the accompanying drawing, in which the sole FIGURE shows a fuel cell system in accordance with the principles of the present invention.

DETAILED DESCRIPTION

As shown in the FIGURE, the fuel cell system 1 includes a fuel cell 10. The cell 10 is assumed to be a phosphoric acid cell, but the principles of the invention extend to other fuel cell types, such as, for example, molten carbonate cells and solid oxide cells. An anode section 2 and a cathode section 3 communicate with an electrolyte matrix 50 and receive fuel process gas and oxidant process gas from fuel and oxidant gas input conduits 5 and 6 respectively. The oxidant gas is derived from oxidant source conduits 7 and 8, the first one of which 7 is fed a portion of the exhausted oxidant gas coupled to an exhaust conduit 9 and the second one of which 8 receives oxidant gas from an oxidant supply 11 after being pressurized by a compressor 12.

The exhausted oxidant gas from the conduit 9 prior to being coupled to the conduit 7 is passed through a heat exchanger 13 situated between the conduits and to which is also supplied water from a supply 14. The output from exchanger 13 comprises steam which is to be used in processing of fresh supply fuel to form the fuel process gas. More particularly, the generated steam is coupled through a conduit 15 to the high temperature section 16 of a combined high temperature-low temperature shift converter 17. The output steam at a higher temperature now in a conduit 18, is combined in a common conduit 21 with pressurized fresh supply fuel received from a conduit 22. Conduit 22 communicates with a supply of fuel 23 which has been pressurized in a compressor 24 and preheated in a heat exchanger 25.

The combined fuel and steam in the line 21 after being heated in a heat exchanger 26 is coupled to a fuel process or reformer 27, the output of which is fuel process gas whose pressure is dependent on that of the steam. The fuel process gas from the reformer 27 is passed through heat exchangers 26 and 25 and the high and low temperature sections 16 and 41 of the converter 17. Water from a supply 42 feeding the low temperature section 41 as well as the other constituents being passed througgh the elements 26, 25 and 16 cool the fuel process gas. The cooled gas is then further cooled to the desired fuel cell input temperature by a further heat exchanger 28 which receives water from the supply 20.

To complete the description of the system, the reformer 27 is provided with reaction heat from a burner 31 to which is supplied a portion of the fuel in the conduit 22 via conduit 32, a portion of the fresh compressed oxidant supply via conduit 33, and the exhausted fuel process gas, via the conduit 34. The latter gases are preheated in respective heat exchangers 36 and 37 to which is also supplied the heated gas of the burner 31. Thereafter, this gas is coupled to a common conduit 38 along with exhausted oxidant gas in a conduit 39 and the combined gases passed through a turboexpander 45 for subsequent exhaust out of the system.

In customary operation of the system 1, the pressures of the fuel process gas in the conduit 5 and the oxidant process gas in the conduit 6 are maintained at substantially the same value (i.e., in normal practice, these pressures might differ by less than about 1 psi). This requires that the steam from the exchanger 13 be of sufficient quantity and pressure that when combined with the fresh supply fuel and introduced into the reformer 27, it results in fuel process gas which is at a pressure substantially equal to that of the oxidant gas. For this to occur, the quantity and temperature of the exhausted oxidant gas coupled to the exchanger 13 must be sufficient to provide steam of the required quantity and pressure.

As the required pressure of the oxidant gas is increased to provide better fuel cell performance, the pressure of the steam from the exchanger 13 must also be increased so as to result in an increase in the fuel process gas pressure provided through the reforming reaction. Increased steam pressure is brought about by increasing the quantity and/or temperature of the exhausted oxidant gas. While increases of this nature can be tolerated to some degree, as required pressures exceed about 30 psia, the quantity and/or temperature required of the exhausted oxidant gas begin to counteract the added benefits of operating at the higher pressures.

In accordance with the principles of the present invention, the benefits of higher pressure fuel cell operation are realized without the detrimental effects which result from the use of exhausted oxidant gas of increased quantity and/or temperature. This is achieved by operating the present system with the oxidant gas pressure at the desired higher pressure for obtaining the benefits of high pressure operation and the fuel process gas at a lesser pressure than practiced in conventional cells and, preferably, at a pressure for which the quantity and temperature constraints required of the cell exhausted oxidant gas for process gas generation can be met without otherwise appreciably detracting from system performance. To this end, in the system of FIG. 1, the pressure $p_1$ of the oxidant gas from the compressor 12 and coupled to the conduit 6 via the conduit 8 is at a first pressure value, while the pressure $p_2$ of the fuel process gas in the conduit 5, as determined by the pressure of the steam generated by the heat exchanger 13 and, in turn, the temperature and quantity of the exhausted oxidant gas in the conduit 9, is at a lower pressure value.

The value of the pressure $p_1$ is preferably made as high as possible and its maximum value is determined generally by the operation of compressor 12, which, in turn, depends on the energy derived from exhaust gas stream 38 upon expansion, this energy being used to run the turbocompressor 12. Typically, a preferable range for this value might be 30 to 200 psia. Furthermore, the difference between the pressures $p_1$ and $p_2$ should be compatible with pressure differentials sustainable by the electrolyte carrying matrix 50 separating the anode and cathode sections 2 and 3. In accordance with the invention, pressure differentials in the range of 10 to 50 psi are contemplated.

A matrix for sustaining pressure differentials in the above range for phosphoric acid fuel cells might comprise a layer of silicon carbide and a layer of carbon, the carbon containing layer having a particle size of less than approximately 500 angstroms and a surface area of greater than approximately 100 square meters per gram. In such case, the anode and cathode section hydrophobic electrodes might comprise catalysts on carbon supports, the carbon of these supports having the same particle size and surface area as the carbon containing layer of the matrix. With this type of matrix construction, a pressure differential capability of up to about 50 psi is to be expected. A matrix of this type is disclosed in copending application Ser. No. 24,416 filed Mar. 27, 1979.

As above-indicated, the use of pressures $p_1$ and $p_2$ for the cell fuel and oxidant gases has attendant advantages over prior fuel cell systems that would require substantially equal pressures for both such gases. Thus, the temperature and quantity of the exhausted oxidant gas needed for producing the reforming reaction steam at the heat exchanger 13 are now less, as is the pressure of the steam required. The fuel cell temperature can therefore be maintained, while the reformer characteristics can be less stringent. An overall simpler and more efficient system thereby results.

The aforesaid benefits of the invention can be better appreciated by the following example. For a cell operating at approximately 50 psia and 30 psia respectively, for the cell oxidant and fuel gases, and at a temperature of 350° F., the pressure of the steam provided by the heat exchanger 13 to the reformer 27 to result in the 30 psia oxidant gas, assuming 40 percent losses, is approximately 50 psia. The quantity of steam produced at this pressure from the exhausted oxidant gas at the cell temperature of 350° F. can be calculated from the following equation:

$$Q = \frac{\text{lb/hr steam}}{\text{lb/hr gas}} = \frac{C_p(t_o - t_p)}{\Delta H}$$

Where
$\Delta H$ is the latent heat of steam
$C_p$ is the heat capacity of oxidant gas
$t_o$ is the initial temperature of oxidant gas
$t_p$ is a temperature equal to the steam saturation temperature $t_s$ which is dependent upon the steam pressure plus a small differential or pinch temperature.

For steam at 50 psia, $t_s$ is 281° F., $\Delta H$ is 924 Btu/lb and $C_p$ is 0.28 Btu/lb°F. Assuming a pinch temperature of 20° F., the quantity of steam produced is $$Q = \frac{0.28\,(350 - 301)}{924}$$

$$Q = 0.015$$

If the fuel cell, however, were operated in accordance with prior practice, i.e., with both the oxidant and fuel gases required to be at approximately 50 psia, the pressure of the steam required to result in 50 psia steam, assuming similar losses, would be approximately 83 psia. For steam at this pressure, $t_s$ is, 315° F., $\Delta H$ is 899 Btu/lb. Again assuming a pinch temperature of 20° and an operating temperature of 350°, the quantity of steam produced is only 0.005, that is a 3-fold decrease in the quantity of steam.

Thus, with the oxidant and fuel gas pressures substantially the same, less steam is produced than in the present case of operation at different pressures. Moreover, in order for the same quantity of steam to be produced in both cases, the operating temperature of the cell in the substantially equal pressure case must be increased which is detrimental to cell life. In the particular example above, the cell temperature in the equal pressure case would have to be increased to 383° F. in order to obtain the same quantity of steam. At this 33° F. higher temperature, the cell life could be substantially reduced. Thus, the operation of the anode at 20 psi lower pressure than the cathode will result in a substantially improved fuel cell life, because of lower operating temperature. The benefits of the present system are therefore apparent.

It also should be noted that the ability to operate the reformer at lower pressures with the present system has the further benefit of providing a lower equilibrium methane content in the resultant fuel produced by the reformer for the fuel cell 10. Since methane generally acts as an inert gas in the fuel cell reaction; but has a high heating value, a reduction in methane content results in a more efficient operation of the fuel cell. Also, the lower pressure reduces the tendency in the reformer of producing carbon by the reaction $$2CO \rightarrow C + CO_2$$

Finally, in the fuel cell 10 itself, lower pressures in the fuel gas are beneficial from a CO poisioning point of view, since poisioning depends on CO partial pressures.

In all cases, it is understood that the above-described arrangements are merely illustrative of the many possible specific embodiments which represent applications of the present invention. Numerous and varied other arrangements can readily be devised in accordance with the principles of the present invention without departing from the spirit and scope of the invention.

What is claimed is:

1. A method for operating a fuel cell system which includes a fuel cell provided with anode and cathode sections, the method comprising
   supplying oxidant process gas to said cathode section at a first pressure; and supplying fuel process gas to said anode section at a second pressure which is less than said first pressure such that the difference between said first and second pressures is greater than about 1 psi.

2. A method in accordance with claim 1 wherein:
the difference between said first and second pressures is greater than about 10 psi.

3. A method in accordance with claim 1 or 2 wherein:
the difference between said first and second pressure is less than about 50 psi.

4. A method in accordance with claim 3 wherein:
said first pressure is within a range of 30 to 200 psia.

5. A method in accordance with claim 3 wherein:
said fuel cell includes a phosphoric acid electrolyte between said anode and cathode sections.

6. A method in accordance with claim 3 wherein:
said step of supplying process gas includes:
   processing a supply of fuel and steam to produce said fuel process gas.

7. A method in accordance with claim 6 wherein:
said step of supplying fuel process gas further includes:
   placing a quantity of exhausted gas from said cathode section and water into heat exchange relationship to produce said steam at a pressure equal to or above said second pressure.

8. A method in accordance with claim 7 wherein:
said second pressure is sufficiently below said first pressure that the temperature required of said exhausted cathode gas for producing said steam is below that which would be required if said second pressure were substantially equal to said first pressure.

9. A method in accordance with claim 8 wherein:
said difference between said first and second pressures is at a maximum.

10. A method in accordance with claim 7 wherein:
said fuel cell includes a phosphoric acid electrolyte between said anode and cathode sections.

* * * * *